United States Patent
Kaiser

(10) Patent No.: US 10,863,229 B1
(45) Date of Patent: Dec. 8, 2020

(54) METHOD AND SYSTEM FOR AUTOMATIC TELEVISION MODEL DETECTION

(71) Applicant: Curbell Medical Products, Inc., Orchard Park, NY (US)

(72) Inventor: Matthew Kaiser, Amherst, NY (US)

(73) Assignee: Curbell Medical Products, Inc., Orchard Park, NY (US)

(*) Notice: Subject to any disclaimer, the term of this patent is extended or adjusted under 35 U.S.C. 154(b) by 0 days.

(21) Appl. No.: 16/593,907

(22) Filed: Oct. 4, 2019

(51) Int. Cl.
*H04N 5/44* (2011.01)
*H04N 21/422* (2011.01)
*H04N 5/445* (2011.01)
*H04N 21/478* (2011.01)

(52) U.S. Cl.
CPC ....... *H04N 21/42204* (2013.01); *H04N 5/445* (2013.01); *H04N 21/42222* (2013.01); *H04N 21/42226* (2013.01); *H04N 21/478* (2013.01)

(58) Field of Classification Search
CPC ............ H04N 5/4403; H04N 21/4222; H04N 21/42225; H04N 5/44; H04N 5/445; H04N 2005/4428; H04N 21/42221; H04N 2005/4435; H04N 2005/44521; H04N 2005/4433; H04N 2005/4426; H04N 2005/4441; H04N 2005/4442; H04N 2005/4444; H04N 21/42226; H04N 21/42227; H04N 21/42228; G08C 2201/92; G08C 2201/20; G08C 19/28

USPC ........... 348/734, 725; 725/37; 340/4.11, 4.3, 340/4.31–4.33, 12.22–12.26, 12.28, 12.29
See application file for complete search history.

(56) References Cited

U.S. PATENT DOCUMENTS

| | | | |
|---|---|---|---|
| 2002/0092019 A1* | 7/2002 | Marcus | H04N 21/2668 725/37 |
| 2008/0088748 A1* | 4/2008 | Lim | H04N 21/4126 348/734 |
| 2015/0131008 A1* | 5/2015 | Robinson | G08C 17/02 348/734 |

* cited by examiner

*Primary Examiner* — Sherrie Hsia
(74) *Attorney, Agent, or Firm* — Hodgson Russ LLP

(57) ABSTRACT

A system and method for identifying a model of a television set is presented. The system may include a user interaction device including a first communication port configured to transmit operational codes to the television set via a control link, and a second communication port configured to detect audio signals from the television set via a feedback link. The user interaction device may be configured to transmit volume-down codes for television models to the television set to program a volume level of the television set to 0. The user interaction device may be configured to transmit a volume-up code for a first television model. The user interaction device may be configured to identify a model of the television set as the first television model if the user interaction device detects an audio signal on the feedback link following the transmission of the volume-up code for the first television model.

32 Claims, 5 Drawing Sheets

METHOD AND SYSTEM FOR AUTOMATIC TELEVISION MODEL DETECTION

FIELD OF THE DISCLOSURE

The present disclosure is generally directed to a system and method for automatically detecting the model of a television set.

BACKGROUND OF THE DISCLOSURE

A pillow speaker is a crucial component in the modern hospital room environment. By connecting to the hospital's nurse call system, the pillow speaker provides the patient a lifeline to communicate with nurses outside of his or her room. Further, many modern pillow speakers provide additional control over aspects of the hospital room environment, such as the room lighting system or the in-room entertainment system. The in-room entertainment system is often embodied by a television set.

Configuring a pillow speaker to pair with a television set can be a complicated and labor-intensive process, often requiring the installer to manually enter a series of model-specific codes into the pillow speaker via a keypad. These codes may only be available in a user manual for the television model. In a modern, large hospital environment, the hospital rooms may have a wide array of television brands and models installed. As a result, finding the correct codes for a specific television model can be a time-consuming process.

Additionally, some television sets can be reconfigured to accept codes that do not correspond to their labelled brands. For example, a ZENITH-branded television set may be configured to respond to RCA codes. This reconfiguration complicates the television installation process, as the installer must be aware of the target television set's internal configuration.

Further, pairing a television set with a pillow speaker may be required any time the pillow speaker or the in-room television set is replaced or upgraded.

Accordingly, there is a critical need for a pillow speaker system which automatically identifies the model of a hospital room television set for pairing purposes.

BRIEF SUMMARY OF THE DISCLOSURE

In an aspect of the present disclosure, a system for identifying a model of a television set is presented. The system may include a user interaction device. The user interaction device may include a first communication port configured to transmit operational codes to the television set via a control link. The user interaction device may include a second communication port configured to detect audio signals from the television set via a feedback link. The user interaction device may be configured to transmit one or more volume-down codes for one or more television models to the television set to program a volume level of the television set to 0. The user interaction device may be configured to transmit a volume-up code for a first television model. The user interaction device may be configured to identify a model of the television set as the first television model if the user interaction device detects an audio signal on the feedback link following the transmission of the volume-up code for the first television model.

The user interaction device may be configured to transmit a volume-up code for a second television model. The user interaction device may be further configured to identify the model of the television set as the second television model if the user interaction device detects an audio signal on the feedback link following the transmission of the volume-up code for the second television model.

In another embodiment of the present disclosure, the control link may be wired. In this embodiment, the user interaction device may include a General Purpose Input Output ("GPIO") port configured to couple to the control link. In another embodiment of the present disclosure, the feedback link may be wired. In this embodiment, the user interaction device comprises a GPIO port configured to couple to the feedback link.

In another embodiment of the present disclosure, the user interaction device may be a patient interaction device ("PID"), such as, for example, a pillow speaker.

The user interaction device may be configured to transmit one or more power-on codes for one or more television models. The user interaction device may be preprogrammed with the power-on codes for one or more television models.

The user interaction device may be preprogrammed with the volume-up codes for one or more television models. The user interaction device may be preprogrammed with the volume-down codes for one or more television models.

The user interaction device may be configured to utilize a complete code set for the model of the television set. The user interaction device may be preprogrammed with the complete code sets for one or more television models.

In another embodiment of the present disclosure, a method for identifying a model of a television set via a user interaction device is presented. The user interaction device may be configured to transmit operational codes to the television set via a control link. The user interaction device may be further configured to detect audio signals from the television set via a feedback link.

The method may include transmitting, from the user interaction device to the television set via the control link, one or more volume-down codes for one or more television models to program a volume level of the television set to 0. The method may further include transmitting, from the user interaction device to the television set via the control link, a volume-up code for a first television model. The method may further include identifying a model of the television set as the first television model if the user interaction device detects an audio signal on the feedback link following the transmission of the volume-up code for the first television model.

The method may further include transmitting, from the user interaction device to the television via the control link, a volume-up code for a second television model. The method may further include identifying the model of the television as the second television model if the user interaction device detects an audio signal on the feedback link following the transmission of the volume-up code for the second television model.

In another embodiment of the present disclosure, the control link may be wired. In this embodiment, the user interaction device may include a GPIO port configured to couple to the control link. In another embodiment of the present disclosure, the feedback link may be wired. In this embodiment, the user interaction device comprises a GPIO port configured to couple to the feedback link.

In another embodiment of the present disclosure, the user interaction device may be a PID, such as, for example, a pillow speaker.

The method for identifying a model of a television set via a user interaction device may further include transmitting, from the user interaction device to the television via the control link, one or more power-on codes for one or more television models. The user interaction device may be preprogrammed with the power-on codes for one or more television models.

The method for identifying a model of a television set via a user interaction device may further include transmitting, from the user interaction device to the television via the control link, a power-off code corresponding to the model of the television set. The user interaction device may be preprogrammed with the power-off codes for one or more television models.

In another embodiment of the present disclosure, the user interaction device may be preprogrammed with the volume-up codes for one or more television models. In another embodiment of the present disclosure, the user interaction device may be preprogrammed with the volume-down codes for one or more television models.

The method for identifying a model of a television set via a user interaction device may further include configuring the user interaction device to utilize a complete code set corresponding to the model of the television set. The user interaction device may be preprogrammed with the complete code sets for one or more television models.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Figure 1:
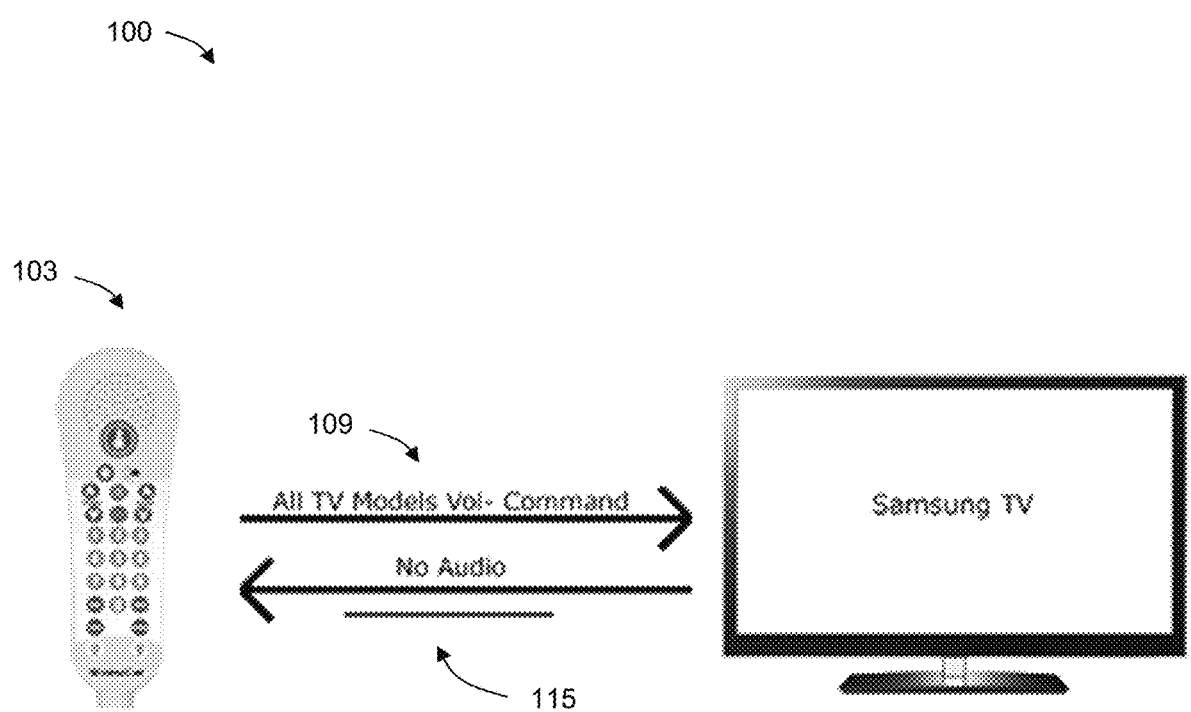
FIG. 1 shows a user interaction device transmitting volume down commands for all known television models to a television set.

In an aspect of the present disclosure, and with reference to FIGS. 1-4, a system 100 for identifying a model of a television set is presented. The system 100 may include a user interaction device 103. The user interaction device 103 may include a first communication port 106 configured to transmit operational codes to the television set via a control link 109. The user interaction device 103 may include a second communication port 112 configured to detect audio signals from the television set via a feedback link 115. The user interaction device 103 may be configured to transmit one or more volume-down codes for one or more television models to the television set to program a volume level of the television set to 0. The transmission of one or more volume down codes is shown in FIG. 1. In FIG. 1, the user interaction device 103 transmits volume-down codes for all known television models to a SAMSUNG television set via control link 109. Sending these volume down codes results in a lack of a detectable audio signal over feedback link 115.

The user interaction device 103 may be configured to transmit a volume-up code for a first television model. The user interaction device 103 may be configured to identify a model of the television set as the first television model if the user interaction device 103 detects an audio signal on the feedback link 115 following the transmission of the volume-up code for the first television model. Television set's typically have an inherent, constant hum or static audio at a volume level of 0. Accordingly, the user interaction device 103 may detect an audio signal by monitoring for a detectable change in the amplitude of the audio present on feedback link 115.

Figure 2:
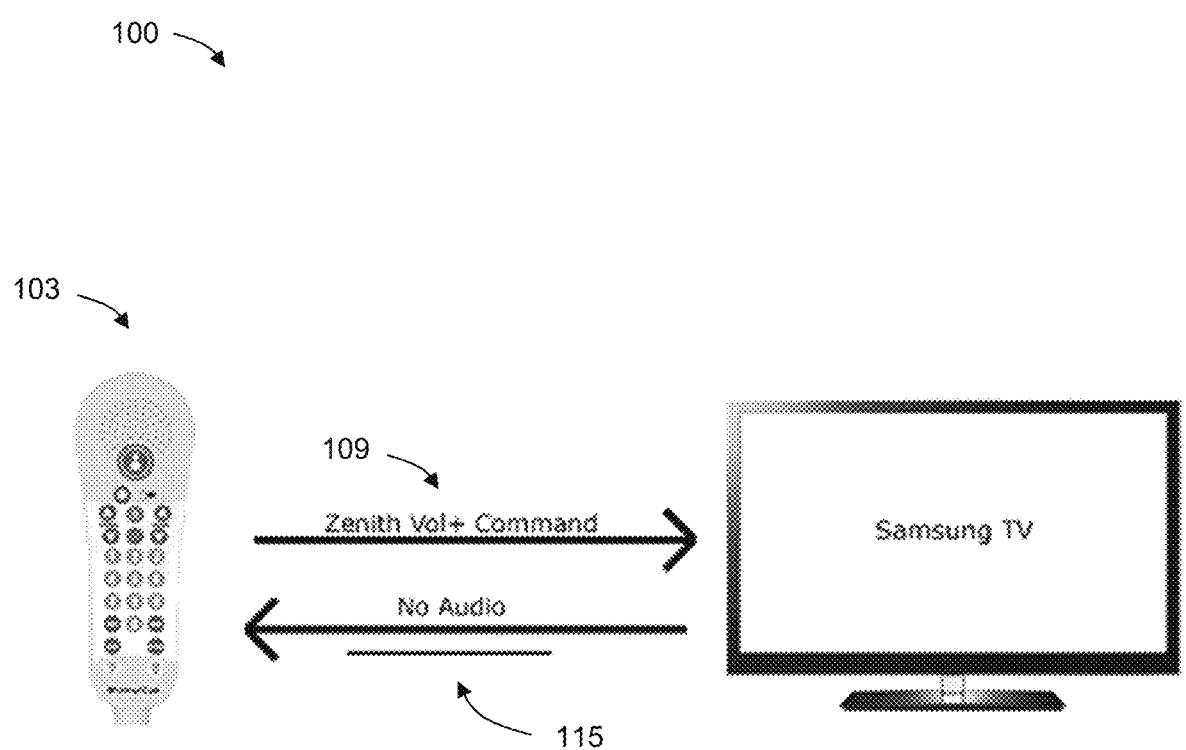
FIG. 2 shows a user interaction device transmitting a volume up command for a first television model to a television set.

The transmission of a volume-up code for a first television model is shown in FIG. 2. In FIG. 2, the user interaction device 103 transmits a ZENITH volume up code to a SAMSUNG television set via control link 109. As the SAMSUNG television set does not recognize the ZENITH volume-up code, the feedback link 115 continues to provide no detectable audio back to the user interaction device 103.

Figure 3:
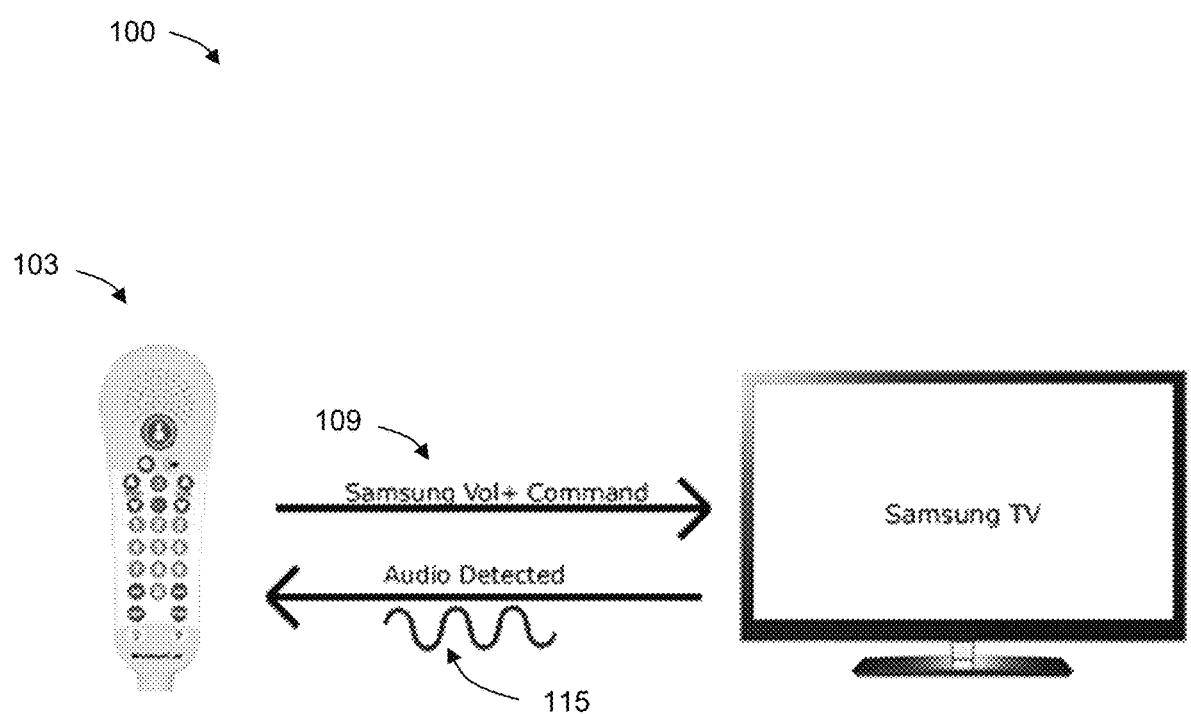
FIG. 3 shows a user interaction device transmitting a volume up command for a second television model to a television set.

The user interaction device 103 may be configured to transmit a volume-up code for a second television model. The user interaction device 103 may be further configured to identify the model of the television set as the second television model if the user interaction device 103 detects an audio signal on the feedback link 115 following the transmission of the volume-up code for the second television model. This volume-up code of the second television model will only be transmitted should no audio be detected following transmission of the volume-up code for the first television model. If no audio on the feedback link 115 is detected following the transmission of the volume-up code of the second television model, volume-up codes for additional television models may be transmitted until audio is detected and the model of the television set is identified. The transmission of a volume-up code for a second television model is shown in FIG. 3. In FIG. 3, the user interaction device 103 transmits a SAMSUNG volume up code to a SAMSUNG television set via control link 109. The SAMSUNG television set recognizes the SAMSUNG volume-up code and increases the volume level of the television set to a detectable volume. The user interaction device 103 then detects the audio signal on feedback link 115, and identifies the model of the television set as a SAMSUNG.

Figure 4:
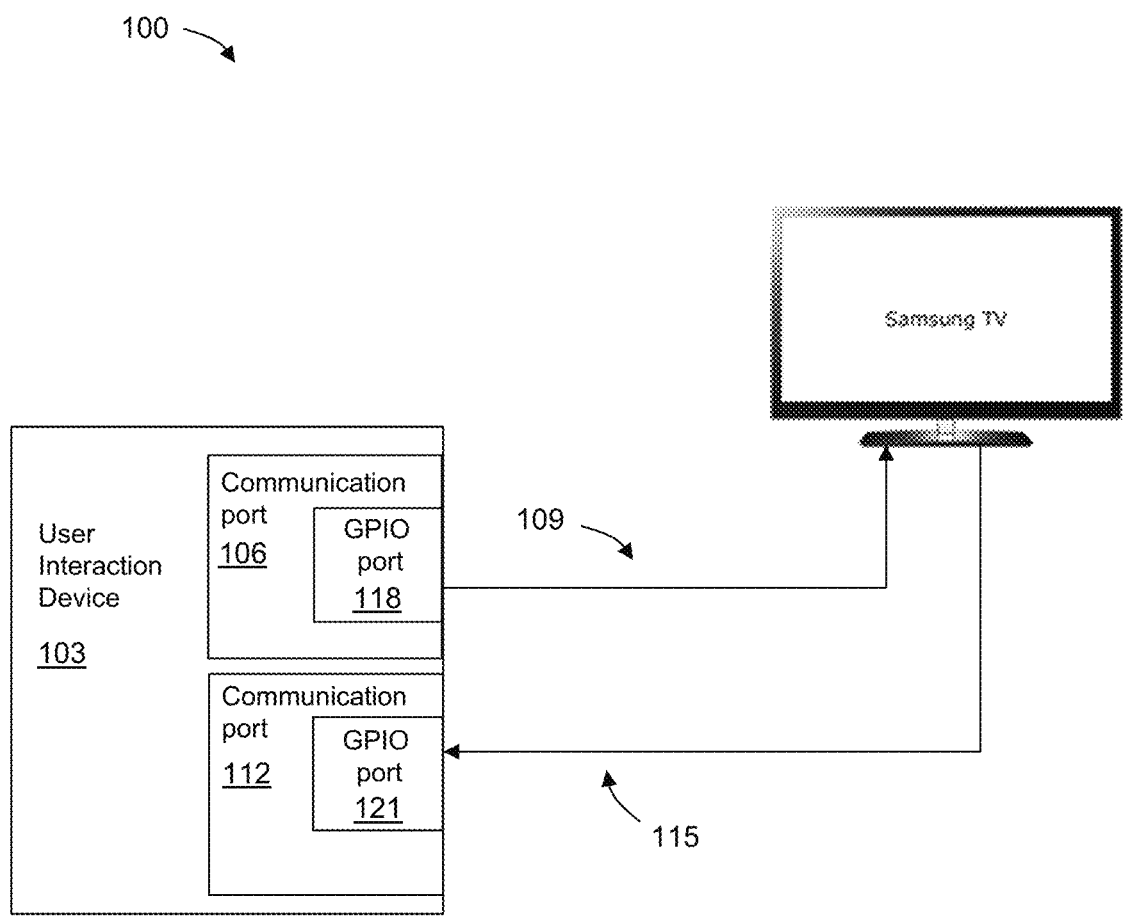
FIG. 4 is a block diagram of a system for identifying a model of a television set.

In another embodiment of the present disclosure, and with reference to FIG. 4, the control link 109 may be wired. In this embodiment, the user interaction device 103 may include a General Purpose Input Output ("GPIO") port 118 configured to couple to the control link 109. In another embodiment of the present disclosure, and with reference to FIG. 4, the feedback link 115 may be wired. In this embodiment, the user interaction device comprises a GPIO port 121 configured to couple to the feedback link 115. In another embodiment of the present disclosure, the control link 109 may be wireless. In another embodiment of the present disclosure, the feedback link 115 may be wireless.

In another embodiment of the present disclosure, the user interaction device 103 may be a patient interaction device ("PID"), such as, for example, a pillow speaker.

The user interaction device 103 may be configured to transmit one or more power-on codes for one or more television models. The user interaction device 103 may be preprogrammed with the power-on codes for one or more television models. In this embodiment, the user interaction device 103 is configured to ensure the television set is turned on before attempting to detect audio on the feedback link 115. The user interaction device 103 may power-on the television set by transmitting the power-on codes for all known television models via the control link 109.

The user interaction device 103 may be preprogrammed with the volume-up codes for one or more television models. The user interaction device 103 may be preprogrammed with the volume-down codes for one or more television models.

The user interaction device 103 may be configured to utilize a complete code set for the model of the television set. This configuration allows the user of the user interaction device 103 access to all television set features once the model of the television set is identified by the aforementioned system. The user interaction device 103 may be preprogrammed with the complete code sets for one or more television models.

It will be recognized that in embodiments of the present disclosure, the television may need to be on and configured to receive a signal. The signal may be, for example, a television channel wherein audio is being received by the television. More particularly, the television may have a tuner set to a channel where audio is received. In this way, the presently-disclosed system or method may detect audio when the volume up code is successfully transmitted to, and received by, the television. In some embodiments, a signal source may be attached to the television (for example, at an HDMI port, an NTSC coaxial port, etc.) Such a signal source may provide a test signal to the television. The test signal may be, for example, an audio tone.

Figure 5:
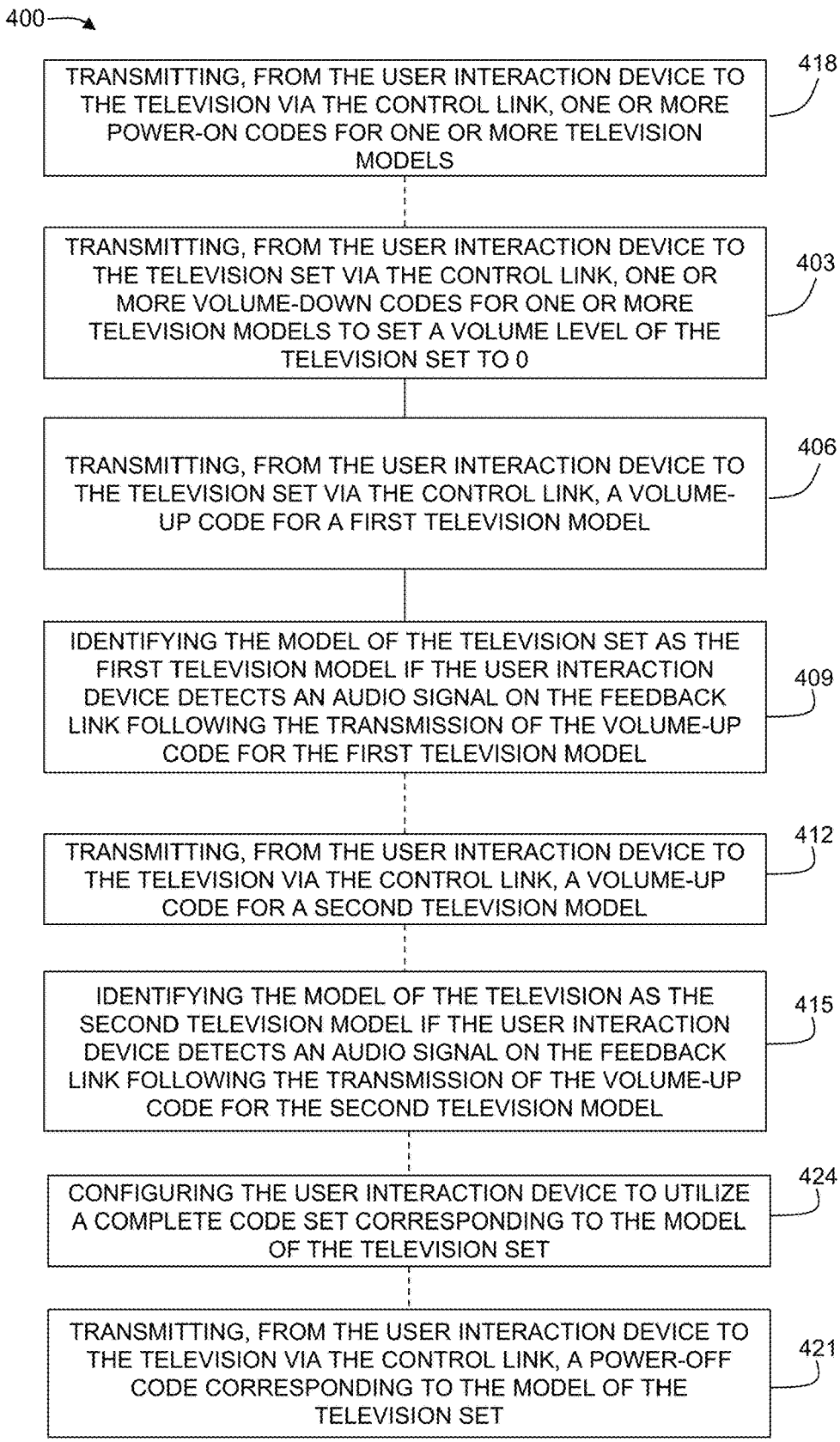
FIG. 5 is a block diagram of a method for identifying a model of a television set.

In another embodiment of the present disclosure, and with reference to FIG. 5, a method 400 for identifying a model of a television set via a user interaction device is presented. In some embodiments of the present disclosure, the user interaction device may be a PID, such as, for example, a pillow speaker. The user interaction device may be configured to transmit operational codes to the television set via a control link. The user interaction device may be further configured to detect audio signals from the television set via a feedback link.

The method 400 may include transmitting 403, from the user interaction device to the television set via the control link, one or more volume-down codes for one or more television models to program a volume level of the television set to 0. The method may further include transmitting 406, from the user interaction device to the television set via the control link, a volume-up code for a first television model.

The method 400 may further include identifying 409 a model of the television set as the first television model if the user interaction device detects an audio signal on the feedback link following the transmission of the volume-up code for the first television model. The feedback link may be a wireless and/or wired connection. For example, in some embodiments, the feedback link is a wired GPIO connection, which may be a link over the same GPIO connection as the control link. In some embodiments, transmitting the volume-up code may comprise transmitting multiple instances of the volume-up code. In this way, a successful transmission to the television (i.e., a transmission that is operably received by the television) will cause the volume to increase to a more readily detectable level.

The method 400 may further include transmitting 412, from the user interaction device to the television via the control link, a volume-up code for a second television model. The method may further include identifying 415 the model of the television as the second television model if the user interaction device detects an audio signal on the feedback link following the transmission of the volume-up code for the second television model.

The method 400 may further include transmitting 418, from the user interaction device to the television via the control link, one or more power-on codes for one or more television models. The user interaction device may be preprogrammed with the power-on codes for one or more television models.

The method 400 may further include transmitting 421, from the user interaction device to the television via the control link, a power-off code corresponding to the model of the television set. The user interaction device may be preprogrammed with the power-off codes for one or more television models.

In some embodiments, the user interaction device may be preprogrammed with the volume-up codes for one or more television models. In some embodiments, the user interaction device may be preprogrammed with the volume-down codes for one or more television models.

The method 400 for identifying a model of a television set via a user interaction device may further include configuring 424 the user interaction device to utilize a complete code set corresponding to the model of the television set. The user interaction device may be preprogrammed with the complete code sets for one or more television models.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

I claim:

1. A method for identifying a model of a television set via a user interaction device, wherein the user interaction device is configured to transmit operational codes to the television set via a control link, and wherein the user interaction device is further configured to detect audio signals from the television set via a feedback link, comprising:
   transmitting, from the user interaction device to the television set via the control link, one or more volume-down codes for one or more television models to program a volume level of the television set to 0;
   transmitting, from the user interaction device to the television set via the control link, a volume-up code for a first television model; and
   identifying a model of the television set as the first television model if the user interaction device detects an audio signal on the feedback link following the transmission of the volume-up code for the first television model.

2. The method of claim 1, further comprising:
   transmitting, from the user interaction device to the television via the control link, a volume-up code for a second television model; and
   identifying the model of the television as the second television model if the user interaction device detects an audio signal on the feedback link following the transmission of the volume-up code for the second television model.

3. The method of claim 1, wherein the control link is wired.

4. The method of claim 3, wherein the user interaction device comprises a General Purpose Input Output ("GPIO") port configured to couple to the control link.

5. The method of claim 1, wherein the feedback link is wired.

6. The method of claim 5, wherein the user interaction device comprises a GPIO port configured to couple to the feedback link.

7. The method of claim 1, wherein the user interaction device is a patient interaction device ("PID").

8. The method of claim 7, wherein the PID is a pillow speaker.

9. The method of claim 1, further comprising transmitting, from the user interaction device to the television via the control link, one or more power-on codes for one or more television models.

10. The method of claim 9, wherein the user interaction device is preprogrammed with the power-on codes for one or more television models.

11. The method of claim 1, further comprising transmitting, from the user interaction device to the television via the control link, a power-off code corresponding to the model of the television set.

12. The method of claim 11, wherein the user interaction device is preprogrammed with the power-off codes for one or more television models.

13. The method of claim 1, wherein the user interaction device is preprogrammed with the volume-up codes for one or more television models.

14. The method of claim 1, wherein the user interaction device is preprogrammed with the volume-down codes for one or more television models.

15. The method of claim 1, further comprising configuring the user interaction device to utilize a complete code set corresponding to the model of the television set.

16. The method of claim 15, wherein the user interaction device is preprogrammed with the complete code sets for one or more television models.

17. A system for identifying a model of a television set, comprising:
 a user interaction device, comprising:
  a first communication port configured to transmit operational codes to the television set via a control link;
  a second communication port configured to detect audio signals from the television set via a feedback link;
 wherein the user interaction device is configured to transmit one or more volume-down codes for one or more television models to the television set to program a volume level of the television set to 0;
 wherein the user interaction device is configured to transmit a volume-up code for a first television model; and
 wherein the user interaction device is configured to identify a model of the television set as the first television model if the user interaction device detects an audio signal on the feedback link following the transmission of the volume-up code for the first television model.

18. The system of claim 17, wherein the user interaction device is configured to transmit a volume-up code for a second television model, and is further configured to identify the model of the television set as the second television model if the user interaction device detects an audio signal on the feedback link following the transmission of the volume-up code for the second television model.

19. The system of claim 17, wherein the control link is wired.

20. The system of claim 19, wherein the first communication port is a General Purpose Input Output ("GPIO") port.

21. The system of claim 17, wherein the feedback link is wired.

22. The system of claim 21, wherein the second communication port is a General Purpose Input Output ("GPIO") port.

23. The system of claim 17, wherein the user interaction device is a patient interaction device ("PID").

24. The system of claim 23, wherein the PID is a pillow speaker.

25. The system of claim 17, wherein the user interaction device is configured to transmit one or more power-on codes for one or more television models.

26. The system of claim 25, wherein the user interaction device is preprogrammed with the power-on codes for one or more television models.

27. The system of claim 17, wherein the user interaction device is configured to transmit a power-off code corresponding to the model of the television set.

28. The system of claim 27, wherein the user interaction device is preprogrammed with the power-off codes for one or more television models.

29. The system of claim 17, wherein the user interaction device is preprogrammed with the volume-up codes for one or more television models.

30. The system of claim 17, wherein the user interaction device is preprogrammed with the volume-down codes for one or more television models.

31. The system of claim 17, wherein the user interaction device is configured to utilize a complete code set for the model of the television set.

32. The system of claim 31, wherein the user interaction device is preprogrammed with the complete code sets for one or more television models.

* * * * *